H. LINTON.
Altitude Instruments.

No. 148,222. Patented March 3, 1874.

Witnesses
James E. Kay
Frederick Standish

Inventor.
Harvey Linton
by Bakewell, Christy & Kerr
his Attys.

UNITED STATES PATENT OFFICE.

HARVEY LINTON, OF BROOKVILLE, PENNSYLVANIA.

IMPROVEMENT IN ALTITUDE-INSTRUMENTS.

Specification forming part of Letters Patent No. 148,222, dated March 3, 1874; application filed October 25, 1873.

*To all whom it may concern:*

Be it known that I, HARVEY LINTON, of Brookville, in the county of Jefferson and State of Pennsylvania, have invented a new and useful Improvement in Combined Level and Clinometer; and I do hereby declare the following to be a full, clear, and exact description thereof, reference being had to the accompanying drawing making a part of this specification, in which—

Figure 1:
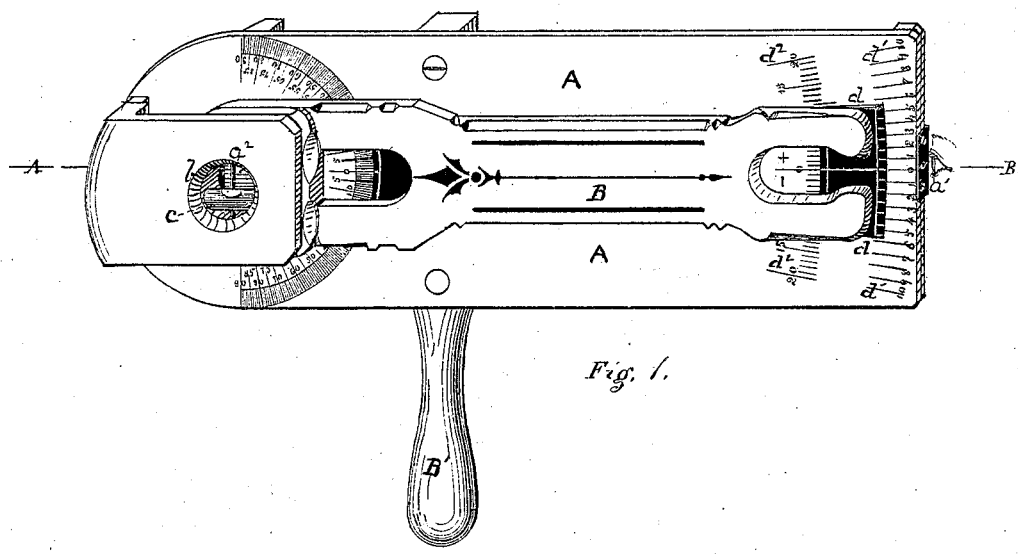
Figure 2:
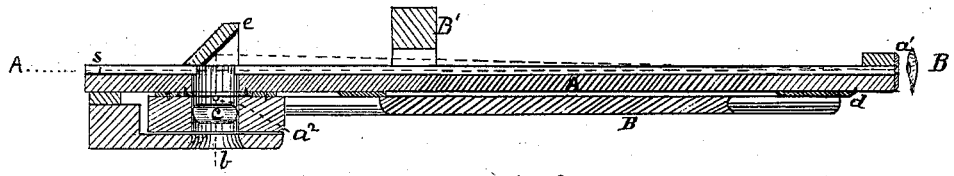

Figure 1 is a front view, in perspective, of my improved level and clinometer; and Fig. 2 is a sectional view thereof through the line A B of Fig. 1.

Like letters of reference indicate like parts in each.

My improvement relates to the construction of a combined level and clinometer, in which a spirit-level and reflecting-mirror are combined with an arm, graduated arc, and slit or telescope in such a way that the instrument may be employed easily and conveniently for use in laying out levels or measuring altitudes or depressions.

To enable others skilled in the art to make and use my improvement, I will proceed to describe its construction and manner of use.

The form of the apparatus may be varied at pleasure, the essential parts being a slit, tube, telescope, or equivalent device for a line of sight, a spirit-level, a reflecting-mirror, a graduated arc, and an arm or index.

In the form shown, the telescopic view or slit, which gives the line of sight, is represented in frame A, along the line A B, the aperture for the eye being at $a^1$, and the spider-threads at $s$. At or near one end of the frame, and in suitable position with reference to the telescopic slit, is pivoted an arm, B, in which is mounted a spirit-level, $c$. The hole $b$ is made opposite the level, both through the arm B and frame A, in order to supply light to the level $c$, and also to a reflecting-mirror, $e$, which is arranged opposite to the level $c$, and in such position that when the bubble in the level comes to the center, or at such point as to indicate that the level in arm B is in a horizontal position, (to indicate which a pin, $a^2$, may be arranged at the side of the level and between it and the mirror,) the position of the bubble will be reflected from the mirror back to the eye at $a^1$. The opposite or free end of the arm may have any suitable index, as shown at $d$, to be used in connection with a system of graduation, as shown at $d^1$, and such graduation may be extended through any desired part of the circle, or through the whole; or two graduated circles may be arranged—one at $d^1$ and the other at $d^2$—each in connection with suitable indexes on the arm B; but in this respect I do not limit myself, and, in connection with the arm B, I employ any desired or known style or system of graduation and index.

The device described may be carried in the hand by the handle B′, or mounted on any suitable tripod or other support, or employed separately or in connection with a compass or other instrument, for use in surveying or engineering.

In actual use as a clinometer, the line of sight is brought into line with the object, the altitude or depression of which is to be ascertained, and the arm B is shifted in position till the bubble in the level $c$ indicates that the level is horizontal. The reading then on the graduated arc will give the angle of elevation or depression.

The manner of using it in laying out levels and running grade-links will be obvious to those skilled in the art.

What I claim as my invention, and desire to secure by Letters Patent, is—

A combined clinometer and level having a telescope or slit for a line of sight, a movable arm carrying a level, a reflecting-mirror, and graduated arc, relatively arranged and operative substantially as set forth.

In testimony whereof I, the said HARVEY LINTON, have hereunto set my hand.

HARVEY LINTON.

Witnesses:
ALFRED WALTER,
W. F. MOORE.